United States Patent
Hernandez

(10) Patent No.: US 6,622,548 B1
(45) Date of Patent: Sep. 23, 2003

(54) METHODS AND APPARATUS FOR ESTIMATING GAS TEMPERATURES WITHIN A VEHICLE ENGINE

(75) Inventor: Claudio A. Hernandez, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/166,807

(22) Filed: Jun. 11, 2002

(51) Int. Cl.$^7$ .............................. G01M 19/00
(52) U.S. Cl. .................. 73/118.1; 73/117.2; 73/116
(58) Field of Search ............... 73/117.2, 117.3, 73/116, 118.1, 118.2, 23.31, 23.32, 25.01; 137/480, 478

(56) References Cited

U.S. PATENT DOCUMENTS

| | | | |
|---|---|---|---|
| 5,540,091 A | * 7/1996 | Nakagawa | 73/117.3 |
| 5,602,332 A | * 2/1997 | Pyko | 73/117.3 |
| 5,653,212 A | * 8/1997 | Hotta et al. | 123/568.16 |
| 5,931,140 A | 8/1999 | Maloney | 123/480 |
| 6,298,299 B1 | * 10/2001 | Itoyama et al. | 701/101 |
| 6,508,111 B2 | * 1/2003 | Osaki et al. | 73/118.1 |
| 6,508,242 B2 | * 1/2003 | Jaliwala et al. | 123/676 |

* cited by examiner

Primary Examiner—Edward Lefkowitz
Assistant Examiner—Corey D. Mack
(74) Attorney, Agent, or Firm—Christopher DeVries

(57) ABSTRACT

Method and apparatus are provided for estimating gas temperatures of a vehicle engine. The method comprises receiving a velocity of the vehicle and an air mass flow rate and estimating an exhaust gas temperature based at least upon the velocity of the vehicle and the air mass flow rate. The method also comprises receiving an EGR mass flow rate and estimating an EGR gas temperature at an EGR valve based at least upon the exhaust gas temperature and the EGR mass flow rate. In addition, the method comprises estimating an EGR gas temperature at a throttle body based at least upon the exhaust gas temperature and the EGR mass flow rate. Furthermore, the method comprises estimating a charge temperature based at least upon the EGR gas temperature at the throttle body, the velocity of the vehicle, and the EGR mass flow rate.

22 Claims, 7 Drawing Sheets

METHODS AND APPARATUS FOR ESTIMATING GAS TEMPERATURES WITHIN A VEHICLE ENGINE

TECHNICAL FIELD

The present invention relates to engine controls and diagnostics, and more particularly to methods and apparatus for estimating gas temperatures of a vehicle engine, and even more particularly to methods and apparatus for estimating gas temperatures within a vehicle engine.

BACKGROUND OF THE INVENTION

Internal combustion engine control strategies are generally known for precisely controlling engine intake air and injected fuel to balance the goals of low emissions, high fuel economy, and high engine performance. Efforts have been made to estimate the mass flow rate of air into an engine cylinder during a cylinder intake event. With an estimate of the mass flow rate of air into an engine cylinder during a cylinder intake event, an appropriate mass of relatively controllable fuel may be appropriately combined according to an engine control strategy. For example, a stoichiometric air/fuel ratio within the engine cylinder can be provided during a cylinder combustion event that supports efficient catalytic treatment of cylinder combustion products.

The mass of air flowing into an engine cylinder is dependent on air density and therefore dependent on air temperature. Recirculated engine exhaust (EGR) gas mass flow information is preferable for control of engine fueling and for high performance engine emissions control. In addition, EGR mass flow is dependent on EGR gas temperature, and accurate information of the temperature of air entering a cylinder is also desirable.

Direct sampling of air temperature has been proposed to provide air temperature information with the desired accuracy. However, conventional temperature transducer durability is relatively low in the inner environment of the cylinder intake. Furthermore, temperature transducers, such as thermocouples, typically lack the transient response characteristics desired to represent the temperature of the turbulent air mass passing through the intake runner to the cylinder during a transient. Therefore, indirect techniques are utilized for determining temperatures within an engine, including estimation techniques, and continuing improvement of the apparatus and methods for estimating temperatures within a vehicle engine are sought to provide the desired accuracy to balance engine-operating parameters such as low emissions, high fuel economy, and high engine performance.

In view of the foregoing, it should be appreciated that it would be desirable to provide methods and apparatus for estimating gas temperatures within a vehicle engine. Furthermore, additional desirable features will become apparent to one skilled in the art from the foregoing background of the invention and following detailed description of a preferred exemplary embodiment and appended claims.

SUMMARY OF THE INVENTION

In accordance with the teachings of the present invention, an apparatus is provided for estimating a plurality of gas temperatures in an engine of a vehicle. The apparatus comprises an exhaust temperature estimator configured to receive a velocity of the vehicle and an air mass flow rate. The exhaust temperature estimator is configured to estimate an exhaust gas temperature based at least upon the velocity of the vehicle and the air mass flow rate. The apparatus also comprises a first recirculated engine exhaust gas (EGR) temperature estimator coupled to the exhaust temperature estimator. The first EGR temperature estimator is configured to receive the exhaust gas temperature from the exhaust temperature estimator and further configured to receive an EGR mass flow rate. The first EGR temperature estimator is configured to estimate an EGR gas temperature at an EGR valve of the engine based at least upon the exhaust gas temperature and the EGR mass flow rate. Similarly, the apparatus comprises a second EGR temperature estimator coupled to the exhaust temperature estimator. The second EGR temperature estimator is configured to receive the exhaust gas temperature from the exhaust temperature estimator and further configured to receive the EGR mass flow rate. The second EGR temperature estimator is configured to estimate an EGR gas temperature at a throttle body of the engine based at least upon the exhaust gas temperature and the EGR mass flow rate. Furthermore, the apparatus comprises a charge temperature estimator coupled to the second EGR temperature estimator. The charge temperature estimator is configured to receive the EGR gas temperature at the throttle body from the second EGR temperature estimator. The charge temperature estimator is further configured to receive the velocity of the vehicle and the EGR mass flow rate. The charge temperature estimator is configured to estimate a charge gas temperature based at least upon the EGR gas temperature at the throttle body, the velocity of the vehicle, and the EGR mass flow rate.

In accordance with the teachings of the present invention, a method is provided for estimating a plurality of gas temperatures of a vehicle engine. The method comprises receiving a velocity of the vehicle and an air mass flow rate and estimating an exhaust gas temperature based at least upon the velocity of the vehicle and the air mass flow rate. The method also comprises receiving an EGR mass flow rate and estimating an EGR gas temperature at an EGR valve based at least upon the exhaust gas temperature and the EGR mass flow rate. In addition, the method comprises estimating an EGR gas temperature at a throttle body based at least upon the exhaust gas temperature and the EGR mass flow rate. Furthermore, the method comprises estimating a charge temperature based at least upon the EGR gas temperature at the throttle body, the velocity of the vehicle, and the EGR mass flow rate.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of the drawings is exemplary in nature and is not intended to limit the invention or the application or use of the invention. Furthermore, there is no intention to be bound by any theory presented in this detailed description of the drawings.

Figure 1:
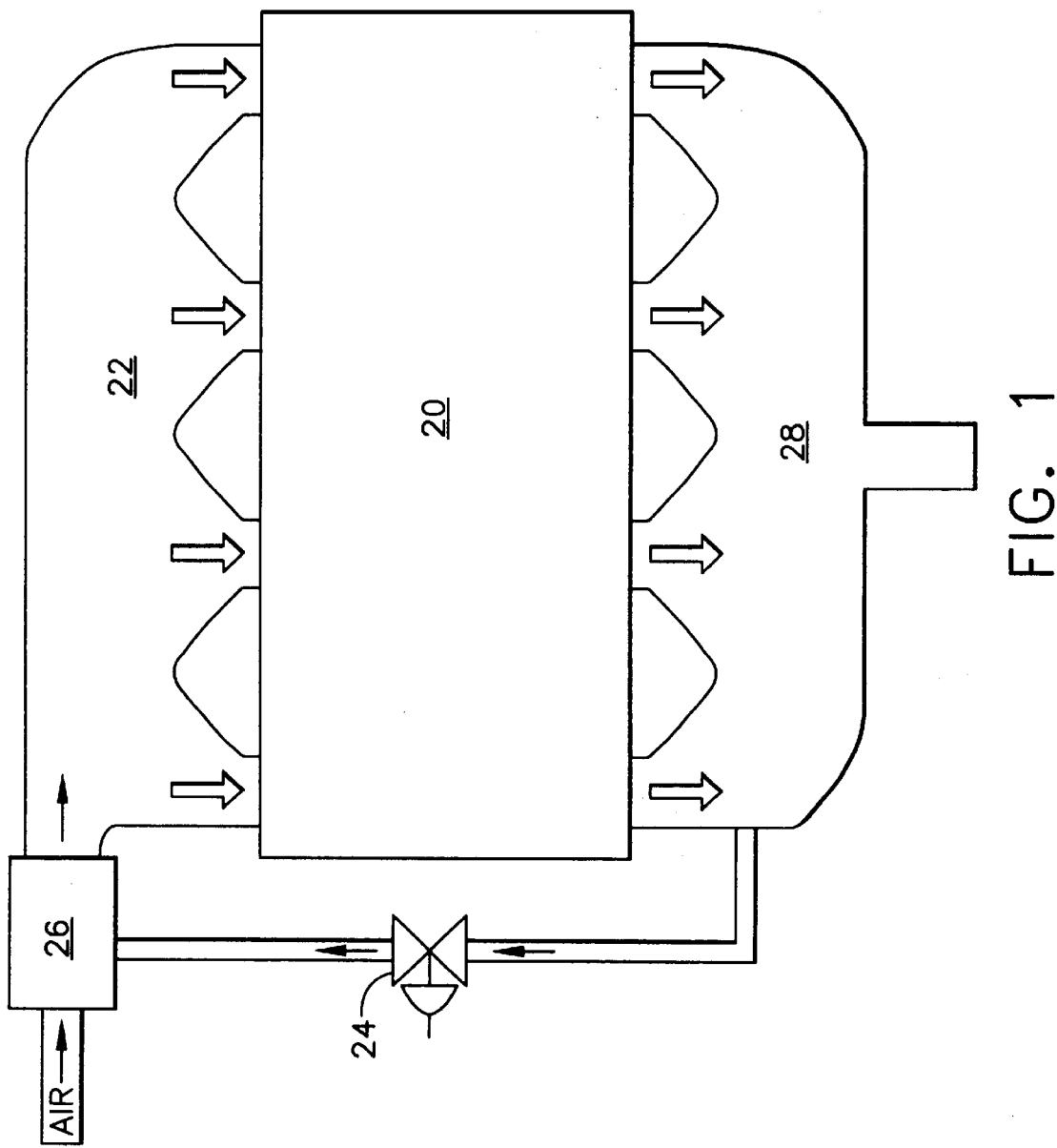
FIG. 1 is a simplified illustration of an engine in which temperatures are estimated in accordance with the apparatus and/or methods of the present invention.

FIG. 1 is a simplified illustration of an engine 20 in which gas temperatures are estimated with the apparatus and/or methods of the present invention. The apparatus and methods of the present invention can be configured to estimate gas temperatures at any number of locations within an engine of a land (e.g., automobiles, trains), air (e.g., aircraft), water (e.g., ships), and space vehicle. For example, and according to a preferred embodiment of the present invention, the apparatus and methods of the present invention can be configured to estimate gas temperatures within an internal combustion engine, and more preferably the gas temperatures within an internal combustion engine at or within the vicinity of the intake manifold 22 (i.e., the charge gas temperature), the EGR valve 24 (i.e., the EGR gas temperature at the EGR valve), the throttle body 26 (i.e., the EGR gas temperature at the throttle body), and/or the exhaust manifold 28 (i.e., the exhaust gas temperature). One or more of these estimated gas temperatures can be utilized for any number of purposes such as for use in an engine control strategy for controlling engine operating parameters (e.g., engine intake air and injected fuel) to balance engine-operating goals (e.g., low emissions, high fuel economy, and high engine performance).

Figure 2:
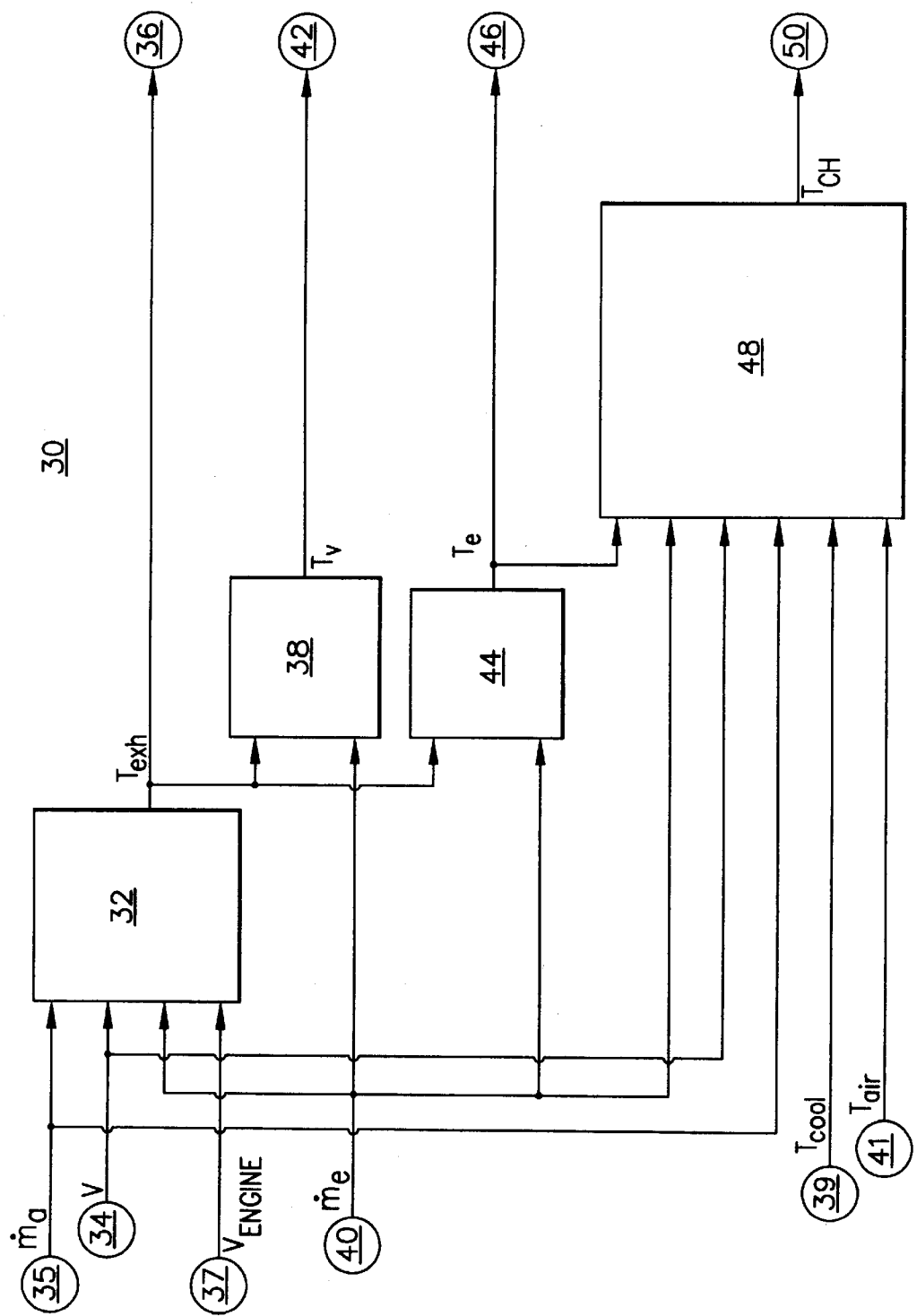
FIG. 2 is an apparatus for estimating the temperatures of an engine of a vehicle in accordance with a preferred exemplary embodiment of the present invention.

Referring to FIG. 2, an apparatus 30 is illustrated according to a preferred exemplary embodiment of the present invention for estimating gas temperatures within an engine of a vehicle, such as the engine 20 shown in FIG. 1. The apparatus 30 comprises an exhaust temperature estimator 32 that is configured to receive a velocity (V) of the vehicle provided at a velocity input 34, an air mass flow rate ($\dot{m}_a$) provided at an air mass flow rate input 35, an estimate of the EGR mass flow rate ($\dot{m}_e$) provided at an EGR mass flow rate input 40, and an engine velocity ($v_{engine}$) provided at an engine velocity input 37. The exhaust temperature estimator 32 is preferably configured to estimate an exhaust gas temperature ($T_{exh}$) within the exhaust manifold 28 of the engine 20 as illustrated in FIG. 1. The estimate of the exhaust gas temperature is based at least upon the velocity of the vehicle and the air mass flow rate, and also preferably based upon the estimate of the EGR mass flow rate and the engine velocity. The estimate of the exhaust gas temperature is provided as an output at an exhaust gas temperature output 36.

The apparatus 30 also comprises a first recirculated engine exhaust (EGR) gas temperature estimator 38 that is coupled to the exhaust gas temperature output 36 and configured to receive the exhaust gas temperature estimated by the exhaust temperature estimator 32. The first EGR gas temperature estimator 38 is also configured to receive the estimate of the EGR mass flow rate provided at the EGR mass flow rate input 40. The first EGR gas temperature estimator 38 is preferably configured to estimate an EGR gas temperature at the EGR valve ($T_V$), such as the EGR gas temperature at or within the vicinity of the EGR valve 24 of the engine 20 as illustratively shown in FIG. 1. The first EGR gas temperature estimator 38 estimates the EGR gas temperature at the EGR valve based at least upon the exhaust gas temperature and the estimate of the EGR mass flow-rate. The EGR gas temperature at the EGR valve is provided as an output at a first EGR temperature output 42.

Similarly, the apparatus 30 comprises a second EGR gas temperature estimator 44 that is also coupled to the exhaust gas temperature output 36 and also configured to receive the exhaust gas temperature estimated by the exhaust temperature estimator 32. The second EGR gas temperature estimator 44 is also configured to receive the estimate of the EGR mass flow rate provided at the EGR mass flow rate input 40. The second EGR gas temperature estimator 44 is preferably configured to estimate a second EGR gas temperature at the throttle body ($T_e$), such as the EGR gas temperature at or within the vicinity of the throttle body 26 of the engine 20 as illustratively shown in FIG. 1. The second EGR gas temperature estimator 44 estimates the EGR gas temperature at the throttle body based at least upon the exhaust gas temperature and the estimate of the EGR mass flow rate. The EGR gas temperature at the throttle body as estimated by the second EGR gas temperature estimator 44 is provided as an output at a second EGR temperature output 46.

In addition to the exhaust temperature estimator 32, the first EGR temperature estimator 38, and second EGR temperature estimator 42, the apparatus 30 comprises a charge temperature estimator 48 that is coupled to the second EGR temperature output 46 of the second EGR temperature estimator 44 and configured to receive the EGR gas temperature at the throttle body. In addition, the charge temperature estimator 48 is configured to receive the velocity of the vehicle provided at the velocity input 34, the air mass flow rate provided at the air mass flow rate input 35, the estimate of the EGR mass flow rate provided at the EGR mass flow rate input 40, an engine coolant temperature ($T_{cool}$) provided at the engine coolant temperature input 39, and an engine inlet air temperature ($T_{air}$) provided at the engine inlet temperature input 41. The charge temperature estimator 48 is configured to estimate a charge gas temperature ($T_{ch}$) based at least upon the EGR gas temperature of the throttle body, the velocity of the vehicle, the air mass flow rate, and the estimate of the EGR mass flow rate, and preferably based also on the engine coolant temperature and the engine inlet air temperature. The charge gas temperature generated by the charge temperature estimator 48 is provided as an output at a charge gas temperature output 50. As previously provided in this description of the detailed description of the drawings, the charge gas temperature, the exhaust gas temperature, first EGR gas temperature, second EGR gas temperature, and/or other temperatures within the engine, can be utilized for any number of engine control strategies, which can be implemented to control engine-operating parameters to balance engine-operating goals (e.g., low emissions, high fuel economy, and high engine performance).

Figure 3:
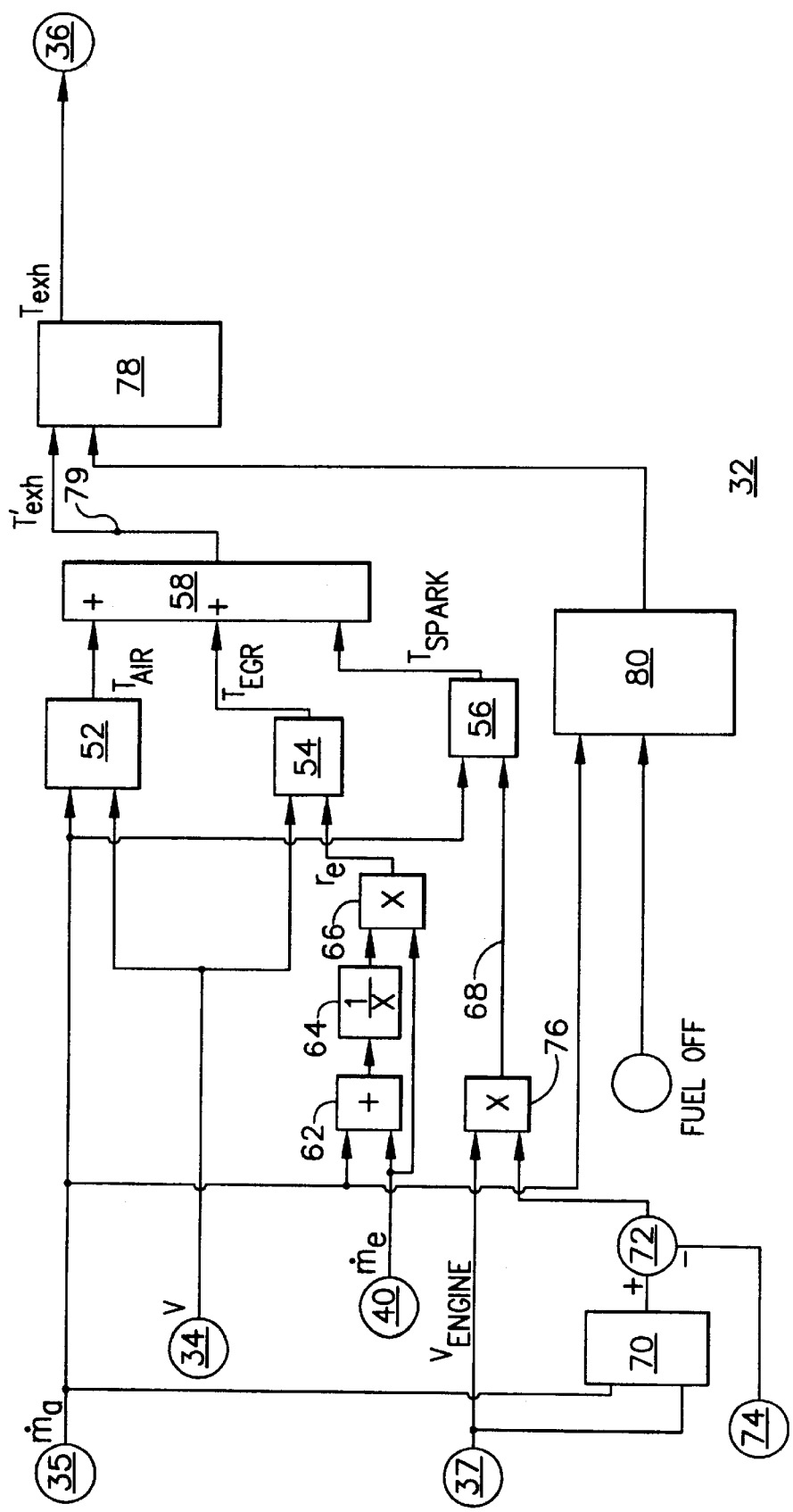
FIG. 3 is the exhaust temperature estimator of FIG. 1 in greater detail in accordance with a preferred exemplary embodiment of the present invention.

Referring to FIG. 3, the exhaust temperature estimator 32 of FIG. 2 is illustrated in greater detail according to a preferred exemplary embodiment of the present invention. In addition, Appendix A provides derivation details for the exhaust temperature estimator 32 according to the preferred exemplary embodiment of the present invention. However, as can be appreciated by one of ordinary skill in the art, other configurations and/or embodiments of the exhaust temperature estimator 32 can be used to estimate the exhaust gas temperature based at least upon the velocity of the vehicle and the air mass flow rate, and preferably also based upon the estimate of the EGR mass flow rate and the engine velocity. The exhaust temperature estimator 32, which can be implemented with software, hardware, or a combination of hardware and software, comprises an air temperature estimator 52, an EGR gas temperature estimator 54 and a spark effect determinator 56.

The air temperature estimator 52 is configured to estimate the air temperature ($T_{air}$), the EGR gas temperature estimator 44 is configured to estimate the EGR temperature ($T_{EGR}$), and the spark effect determinator 46 is configured to estimate the effect of engine spark on temperature (i.e., spark effect) ($T_{spark}$). The estimates of the air temperature, EGR temperature, and spark effect are provided to an exhaust temperature summer 58 that sums the air temperature estimate, EGR temperature estimate, and spark effect to produce the estimate of the exhaust gas temperature ($T'_{exh}$) as follows:

$$T'_{exh} = T_{air} + T_{EGR} + T_{spark} \quad (1)$$

The air temperature estimator 52, EGR gas temperature estimator 54, and spark effect determinator 56 are preferably lookup table operators that are used to determine the air temperature estimate, EGR temperature estimate, and the estimate of the effect of engine spark on temperature, which are non-linear functions.

More specifically, the air temperature estimate is a function of the air mass flow rate and velocity of the vehicle (i.e., $T_{air} = f(\dot{m}_a, v)$), the EGR temperature estimate is a function of the EGR ratio ($r_e$) and velocity of the vehicle (i.e., $T_{EGR} = f(r_e, v)$), and the spark effect is a function of air mass flow and engine speed ((i.e., $T_{spark} = f(\dot{m}_a, v_{engine})$). In accordance with a preferred embodiment of the present invention, the lookup tables for the air temperature estimator 52, EGR gas temperature estimator 54 and/or spark effect determinator 56 are experimentally generated with techniques known to one of ordinary skill in the art. However, the lookup tables can be generated with other techniques known to one of ordinary skill in the art such as empirical calculation or the non-linear functions can be determined using techniques other than a look up operation, such as periodic calculations of the values.

The variables from which the air temperature estimator 52, EGR gas temperature estimator 54 and/or spark effect determinator 56 are configured to estimate the air temperature, EGR temperature and spark effect temperature, respectively, are a combination of measured values and calculated values from the measured values. The air mass flow and the velocity of the vehicle are preferably measured with sensors as known by one of ordinary skill in the art. The EGR ratio is calculated from the air mass flow and the estimate of the EGR mass flow rate that can be estimated according to any number of techniques known to one of ordinary skill in the art. Alternatively, the estimate of the EGR mass flow rate can be determined according to a technique of a preferred exemplary embodiment of the present invention as set forth in Appendix B.

Once the estimate of the EGR mass flow rate is determined according to the technique of a preferred exemplary embodiment of the present invention or according to any number of techniques known to one of ordinary skill in the art, the calculation of the EGR ratio is conducted with a summer 62, inverter 64, and multiplier 66 to perform the following mathematical operation:

$$r_e = \frac{\dot{m}_e}{\dot{m}_a + \dot{m}_e} \quad (2)$$

In addition, once the measured values of the air mass flow rate and velocity of the vehicle are received at the corresponding air mass flow rate input 35 and the velocity of the vehicle input 34, respectively, and the estimate of the EGR mass flow rate is received at the EGR mass flow rate input 40, the table look-up operation can be performed by the air temperature estimator 52 to determine the air temperature. Furthermore, the table look-up operation can be performed by the EGR gas temperature estimator 54 to determine the EGR temperature after the EGR ratio is calculated from the EGR mass flow rate and the air mass flow rate.

Before the effect of spark on temperature can be summed with the estimates of the air temperature and the EGR temperature to produce the exhaust temperature, the spark factor provided at the spark input 68 of the spark effect determinator 56 is determined from the air mass flow rate and the engine velocity. The spark factor is the product of the engine velocity and the difference between the actual torque of the engine and the Maximum Best Torque (MBT). The MBT is determined from an MBT determinator 70 that is preferably a lookup table operator. The MBT is a function of the air mass flow-rate and the engine velocity received at the air mass flow rate input 35 and the engine velocity input 37, respectively. In accordance with a preferred exemplary embodiment of the present invention, the MBT lookup table for the MBT determinator 70 is experimentally generated with techniques known to one of ordinary skill in the art. However, the MBT lookup table can be generated with other techniques know to one of ordinary skill in the art such as empirical calculation, or the MBT can be determined using techniques other than a look up operation, such as periodic calculations of the values.

The MBT determined by the MBT determinator 70 is presented to a subtractor 72, which also receives the actual engine torque received at an actual engine torque input 74, which is preferably measured or calculated with apparatus and techniques known to one of ordinary skill in the art. The actual torque is subtracted from the MBT and the result (i.e., the difference between the MBT and the actual torque) is multiplied by the engine speed with a multiplier 76 to produce the spark effect. The spark effect is presented to the spark effect determinator 56 with the air mass flow rate, and the spark effect temperature is determined by the spark effect determinator using the table lookup operation as previously described in this detailed description of the drawings. As also previously described in this detailed description of the drawings, the spark effect temperature, EGR temperature, and the air temperature are provided to the exhaust temperature summer 58 that sums the three values and produces the exhaust temperature.

Figure 4:
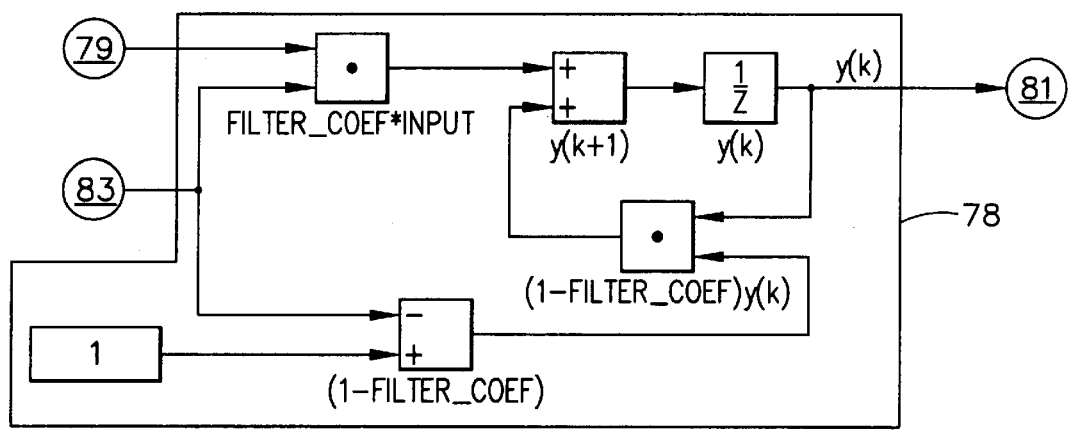
FIG. 4 is the filter of FIG. 3 in greater detail in accordance with a preferred exemplary embodiment of the present invention.

In accordance with a preferred exemplary embodiment of the present invention, the exhaust temperature is preferably filtered with a filter 78, which is preferably a first order lag filter that removes the high frequency components of the exhaust temperature. Referring to FIG. 4, the filter 78 is shown in greater detail in accordance with a preferred exemplary embodiment of the present invention. The filter 78 provides the following operation on the input provided at the filter input 79 to produce the filtered output at the filter output 81, which in this instance is the exhaust gas temperature output 36:

$$y(k)=(1-\text{Filter\_Coef})y(k-1)+(\text{Filter\_Coef})x(k) \qquad (8)$$

where k is the integration step, x(k) is the input signal at the integration step, y(k) is the filtered input at the integration step, y(k-1) is the filtered input at the previous integration step, and Filter_Coef is the filter time constant received at the filter coefficient input 83.

Figure 5:
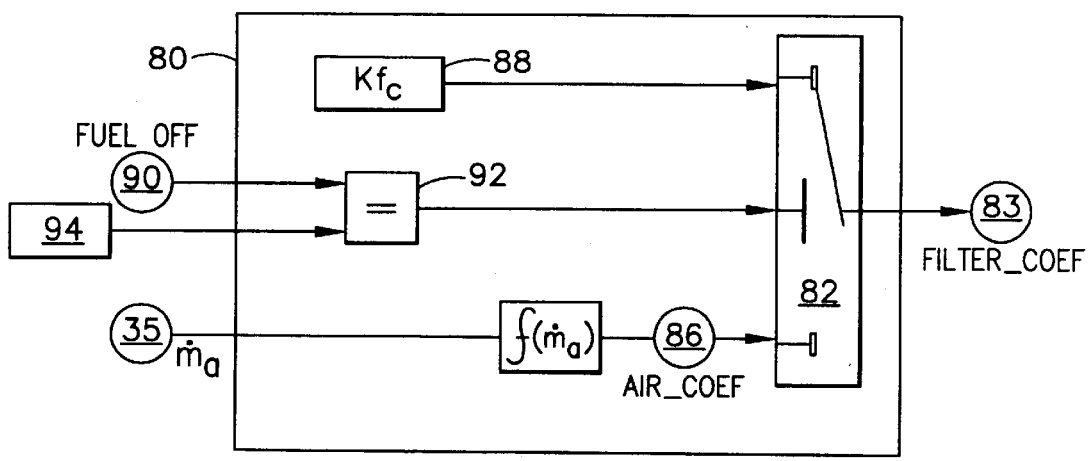
FIG. 5 is the time constant selector of FIG. 3 in greater detail in accordance with a preferred exemplary embodiment of the present invention.

Referring to FIG. 5, a time constant selector 80 for the filter 78 of shown in FIG. 4 is shown in greater detail. However, it should be understood that the filter time constant can be selected using other techniques and can also be based upon other criteria according to the present invention. The time constant selector 80 comprises a switch 82 that is configured to provide a first coefficient 86 or a second coefficient 88 as the filter time constant 83 based upon an evaluation of a fuel cut off indicator provided at the fuel cut off input 90. The first coefficient 86 is preferably an air coefficient (air_coef) that is a function of the air mass flow rate (i.e., air_coef=f($\dot{m}_a$)) and the second coefficient 88 is preferably a constant ($Kf_c$) that accounts for the effects introduced when the fuel supply to the engine is discontinued and the air mass flow rate is reduced to a minimum. As the fuel supply is discontinued and the air mass flow rate is reduced to a minimum, the exhaust temperature rapidly decreases and the second coefficient 88 preferably compensates for this rapid decrease.

The second coefficient 88 can be selected based upon a table lookup operation and the air coefficient is also preferably implemented using a table lookup operation, as the air coefficient is a non-linear function of the air mass flow rate. The lookup tables can be experimentally generated with techniques known to one of ordinary skill in the art. However, the lookup tables can be generated with other techniques, such as empirical calculation, or these non-linear functions can be determined using techniques other than lookup operations, such as periodic calculations, to account for the effects introduced with the cut off of the fuel.

According to a preferred embodiment, the fuel cut off indicator is evaluated by a comparator 92 that generates a signal to configured the switch 82 for selection of the first coefficient 86 if the fuel cut off indicator is not equal to a predetermined value 94 and configures the switch 82 for selection of the second coefficient if the fuel cut off indicator is equal to the predetermined value 94. However, any number of configurations can be used to provide the first coefficient 86 as the filter time constant 83 if a first condition exists and the second coefficient 88 as the filter time constant 83 if a second condition exists. As previously described in this detailed description of the drawings and with momentary reference to FIG. 3, the filter time constant is preferably used to filter the exhaust gas temperature ($T_{exh}$) estimated by the exhaust gas temperature estimator 32, and the filtered exhaust gas temperature ($T_{exh}$) is preferably provided at the exhaust gas temperature output 36 and subsequently utilized for estimation of other gas temperatures.

Figure 6:
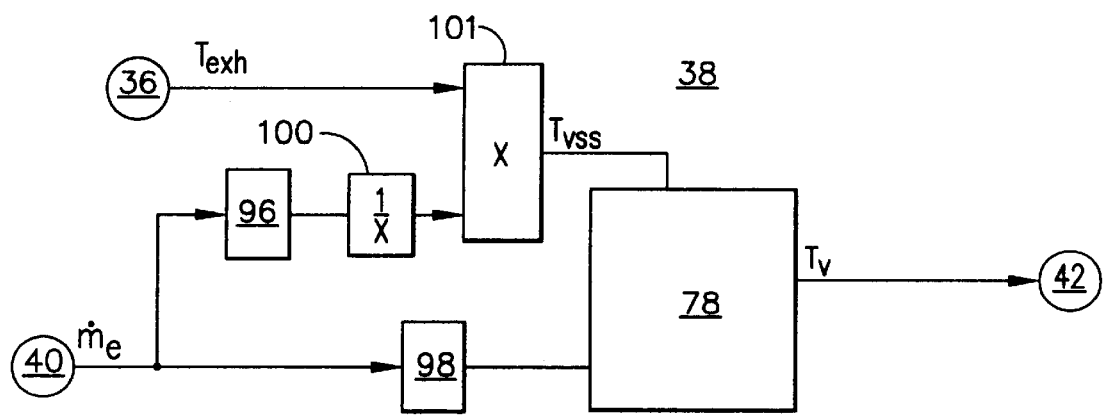
FIG. 6 is the first recirculated engine exhaust (EGR) gas temperature estimator of FIG. 1 in accordance with a preferred exemplary embodiment of the present invention.

Referring to FIG. 6, the first EGR temperature estimator 38 of FIG. 2 is illustrated in greater detail according to a preferred exemplary embodiment of the present invention. In addition, Appendix A provides derivation details for the first EGR gas temperature estimator 38 according to the preferred exemplary embodiment of the present invention. However, as can be appreciated by one of ordinary skill in the art, other configurations and/or embodiments of the first temperature estimator 38 can be used to estimate the EGR gas temperature at the EGR valve ($T_v$) based at least upon the exhaust gas temperature ($T_{exh}$) and the estimate of the EGR mass flow-rate ($\dot{m}_e$). The first EGR gas temperature estimator 38, which can be implemented with software, hardware, or a combination of hardware and software, comprises a first steady-state EGR temperature estimator 96 and a first EGR time constant determinator 98.

The first steady-state EGR temperature estimator 96 is configured to estimate the steady-state EGR temperature at the EGR valve and the first EGR time constant determinator 98 is configured to provide the filter time constant for the filter 78 as described with reference to FIG. 4, which is preferably a first order lag filter that removes the high frequency components of the EGR gas temperature at the EGR valve. The first steady-state EGR temperature estimator 96 and first EGR time constant determinator 98 are preferably lookup table operators that are used to determine the estimate of the steady-state EGR temperature at the EGR valve and the first EGR time constant, which are non-linear functions.

More specifically, the estimate of the steady-state EGR gas temperature at the EGR valve is a function of the EGR mass flow rate (i.e., $T_{vss}$=f ($\dot{m}_e$)), and the time filter constant produced by the first EGR time constant determinator 98 is also a function of the EGR mass flow rate (i.e., first EGR time constant=f ($\dot{m}_e$)). In accordance with a preferred embodiment of the present invention, the lookup tables for first steady-state EGR temperature estimator 96 and the first EGR time constant determinator 98 are experimentally generated with techniques known to one of ordinary skill in the art. However, the lookup tables can be generated with other techniques known to one of ordinary skill in the art such as empirical calculation.

Once the estimate of the steady-state EGR temperature at the EGR valve is determined according to the technique of a preferred exemplary embodiment of the present invention or according to any number of techniques known to one of ordinary skill in the art, the calculation of the EGR gas temperature of the EGR valve is conducted with an inverter 100 and multiplier 101 to perform the following mathematical operation as described in Appendix A:

$$T_{vss} \approx T_{exh} * \frac{1}{f_v(\dot{m}_e)} \qquad (9)$$

In addition, once the first EGR time constant determinator 98 determines the filter time constant for the filter 78, the EGR gas temperature of the EGR valve is preferably filtered with the filter 78 and provided at the first EGR temperature output 42. Furthermore, the EGR gas temperature at the throttle body is similarly calculated and filtered in accordance with the present invention.

Figure 7:
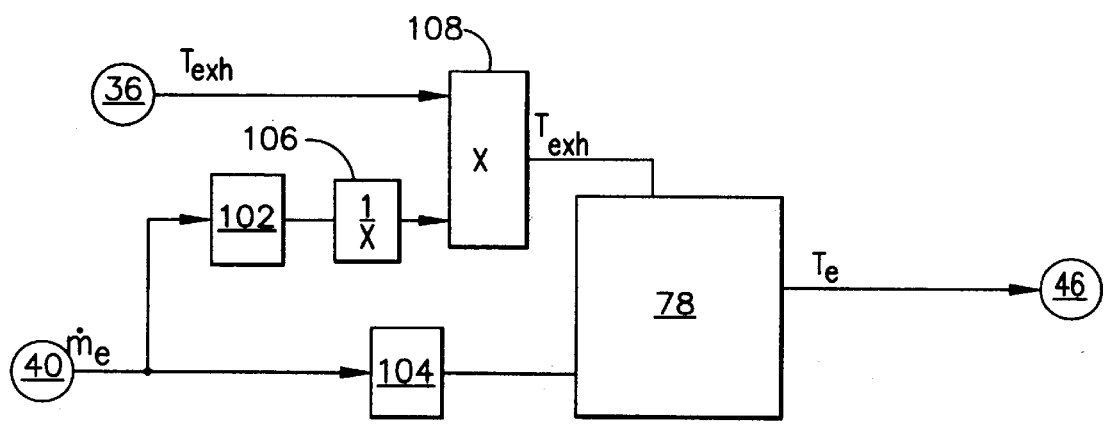
FIG. 7 is the second EGR gas temperature estimator of FIG. 1 in accordance with a preferred exemplary embodiment of the present invention.

More specifically, and referring to FIG. 7, the second EGR temperature estimator 44 of FIG. 2 is illustrated in greater detail according to a preferred exemplary embodiment of the present invention. In addition, Appendix A provides derivation details for the second EGR gas temperature estimator 44 according to the preferred exemplary embodiment of the present invention. However, as can be appreciated by one of ordinary skill in the art, other configurations and/or embodiments of the second EGR gas temperature estimator 44 can be used to estimate the EGR gas temperature at the throttle body ($T_{ess}$) based at least upon the exhaust gas temperature ($T_{exh}$) and the estimate of the EGR mass flow-rate ($\dot{m}_e$). The second EGR gas temperature estimator 44, which can be implemented with software, hardware, or a combination of hardware and software, comprises a second steady-state EGR temperature estimator 102 and a second EGR time constant determinator 104.

The second steady-state EGR temperature estimator 102 is configured to estimate the steady-state EGR temperature at the throttle body and the second EGR time constant determinator 104 is configured to provide the filter time constant for the filter 78 as described with reference to FIG. 4, which is preferably a first order lag filter that removes the high frequency components of the EGR gas temperature at the throttle body. The second steady-state EGR temperature estimator 102 and second EGR time constant determinator 104 are preferably lookup table operators that are used to determine the estimate of the steady-state EGR temperature at the throttle body and the second EGR time constant, which are non-linear functions.

More specifically, the estimate of the steady-state EGR temperature at the throttle body that is produced by the second steady-state EGR temperature estimator 102 is a function of the EGR mass flow rate (i.e., $T_{ess}=f(\dot{m}_e)$), and the filter time constant produced by the second EGR time constant determinator 104 is also a function of the EGR mass flow rate (i.e., second EGR time constant=$f(\dot{m}_e)$). In accordance with a preferred embodiment of the present invention, the lookup tables for the second steady-state EGR temperature estimator 102 and second EGR time constant determinator 104 are experimentally generated with techniques known to one of ordinary skill in the art. However, the lookup tables can be generated with other techniques known to one of ordinary skill in the art such as empirical calculation.

Once the estimate of the steady-state EGR temperature at the throttle body is determined according to the technique of a preferred exemplary embodiment of the present invention or according to any number of techniques known to one of ordinary skill in the art, the calculation of the second EGR temperature is conducted with an inverter 106, and multiplier 108 to perform the following mathematical operation as discussed in Appendix D:

$$T_{ess} \approx T_{exh} * \frac{1}{f(\dot{m}_e)} \tag{10}$$

In addition, once the second EGR time constant determinator 104 determines the filter time constant for the filter 78, the second EGR temperature is preferably filtered with the filter 78 and provided at the second EGR temperature output 46, and also provided as an input to the charge temperature estimator 48 as shown in FIG. 2.

Figure 8:
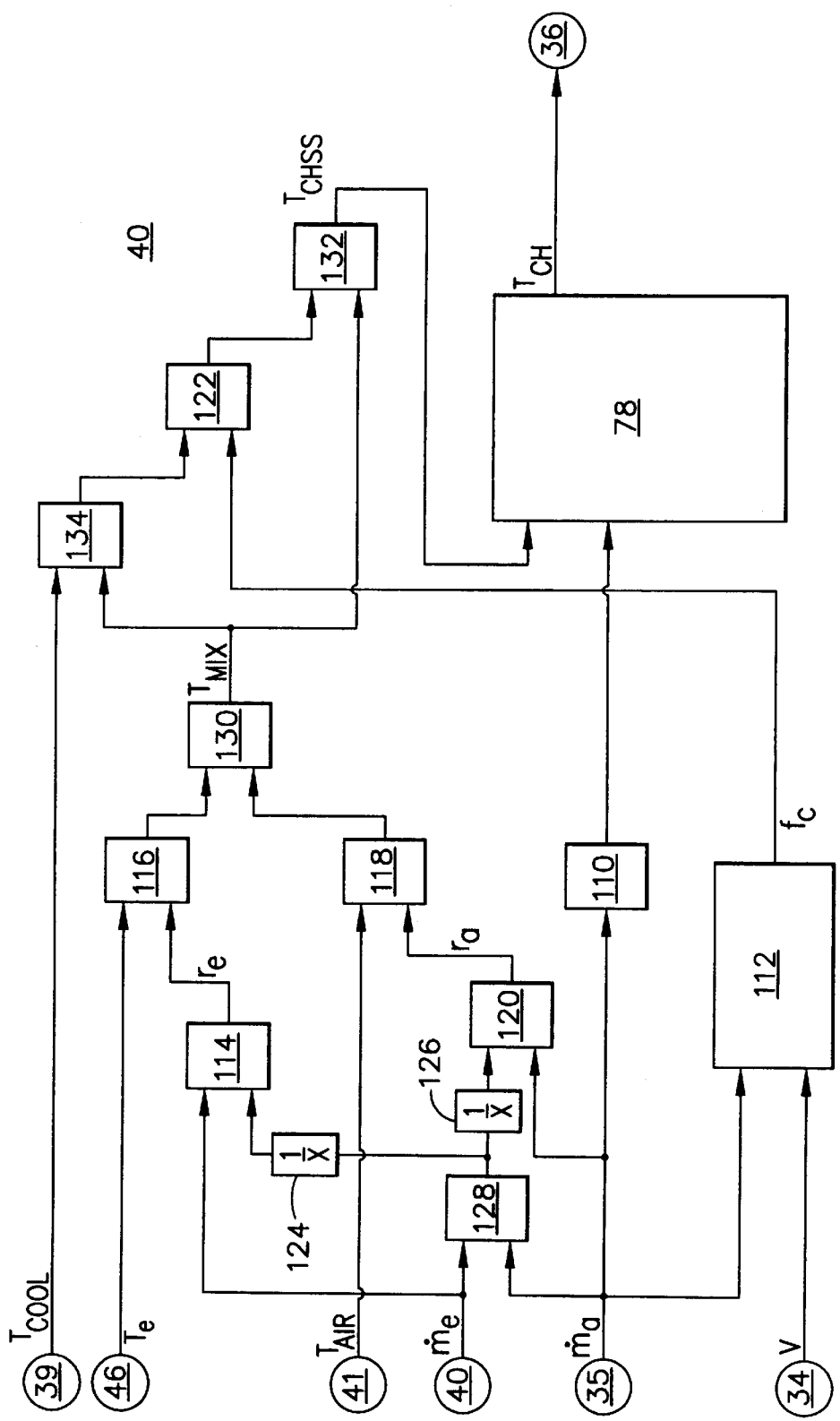
FIG. 8 is the charge temperature estimator of FIG. 1 in accordance with a preferred exemplary embodiment of the present invention.

Referring to FIG. 8, the charge temperature estimator 40 of FIG. 1 is illustrated in accordance with a preferred exemplary embodiment of the present invention. In addition, Appendix A provides derivation details for the charge temperature estimator 40 according to the preferred exemplary embodiment of the present invention. However, as can be appreciated by one of ordinary skill in the art, other configurations and/or embodiments of the charge temperature estimator 40 can be used to estimate the charge gas temperature ($T_{ch}$) based at least upon the EGR gas temperature at the throttle body ($T_e$), the velocity of the vehicle, and the estimate of the EGR mass flow rate, and preferably also based upon the engine coolant temperature, engine inlet temperature, the air mass flow rate and the velocity of the vehicle. The charge temperature estimator 40, which can be implemented with software, hardware, or a combination of hardware and software, comprises a charge time constant determinator 110, a coolant coefficient determinator 112, and multiple mathematical operators as subsequently described in this detailed description of the drawings.

The charge time constant determinator 110 is configured to determine the filter time constant for the filter 78, and the coolant coefficient determinator 112 is configured to determine the coolant coefficient ($f_c$) as a function of air mass flow rate and velocity of the vehicle (i.e., $f_c=f(\dot{m}_a,v)$). In addition, the multiple mathematical operators are configured to provide the following mathematical operation for calculation of the charge gas temperature:

$$T_{chss} \approx T_{mix}+f_c(T_{cool}-T_{mix}) \tag{11}$$

where: $T_{cool}$ is the coolant temperature, and:

$$T_{mix}=r_a T_{air}+r_e T_e \tag{12}$$

where: $T_{air}$ is the engine inlet temperature, $r_e$ is the EGR ratio set forth in equation (2), and $r_a$ is the air ratio provided in equation (13).

$$r_a = \frac{\dot{m}_a}{\dot{m}_a + \dot{m}_e} \tag{13}$$

The charge time constant determinator 110 and the coolant coefficient determinator 112 are preferably lookup table operators that are used to determine the filter time constant (Filter_Coef) and the coolant coefficient ($f_c$), respectively. More specifically, the filter time constant is a function of the air mass flow rate (i.e., Filter_Coef=$f(\dot{m}_a)$), and the coolant coefficient is a function of the air mass flow rate and the velocity of the vehicle (i.e., $f_c=f(\dot{m}_a, v)$ as previously described in this detailed description of the drawings). In accordance with a preferred embodiment of the present invention, the lookup tables for charge time constant determinator 110 and the coolant coefficient determinator 112 are experimentally generated with techniques known to one of ordinary skill in the art. However, the lookup tables can be generated with other techniques known to one of ordinary skill in the art such as empirical calculation.

The variables from which the charge temperature estimator 44 estimates the charge gas temperature are a combination of measured values and calculated values from the measured values. The air mass flow rate, coolant temperature, inlet air temperature and the velocity of the vehicle are preferably measured with sensors as known by one of ordinary skill in the art. As previously described in this detailed description of the drawings, the EGR ratio and the air ratio are calculated from the air mass flow rate and the estimate of the EGR mass flow rate that can be estimated according to any number of techniques known to one of ordinary skill in the art or can be determined according to a technique of a preferred exemplary embodiment of the present invention as set forth in Appendix B.

Once the estimate of the EGR mass flow rate, air mass flow rate, and coolant coefficient are determined as previously described in this detailed description of the drawings and the inlet air temperature and coolant temperature are provided at the inlet air temperature input 41 and the engine coolant temperature input 39, the calculation of the charge gas temperature is conducted with multipliers (114, 116, 118, 120, 122), inverters (134, 126), adders (128, 130, 132), and subtractors (134) to perform the mathematical operation set forth in equation (11). In addition, once the charge time constant determinator 110 determines the filter time constant for the filter 78, the charge gas temperature is preferably filtered with the filter 78 and provided at the charge gas temperature output 50. The charge gas temperature can be used individually or in combination with the exhaust gas temperature, EGR gas temperature at the EGR valve, and/or the EGR gas temperature at the throttle body for any number of purposes such as for use in an engine control strategy for controlling engine operating parameters (e.g., engine intake air and injected fuel) to balance engine-operating goals (e.g., low emissions, high fuel economy, and high engine performance.)

Figure 9:
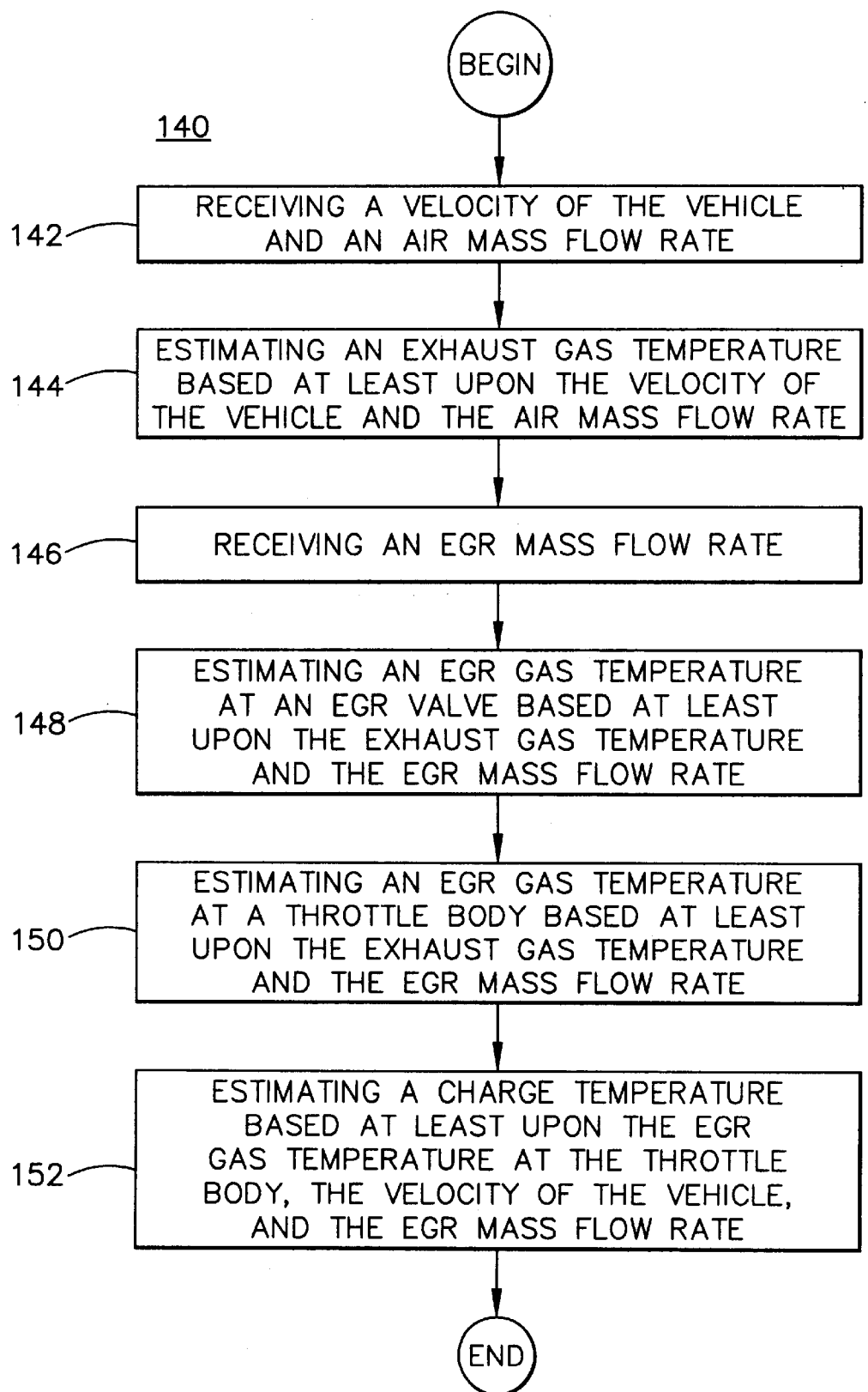
FIG. 9 is a flowchart illustrating the method for estimating the temperatures of an engine of a vehicle in accordance with a preferred exemplary embodiment of the present invention.

As can be appreciated by one of ordinary skill in the art, the apparatus 30 as shown in FIG. 1 and previously described in this detailed description of preferred embodiments provides numerous benefits, and the method for estimating a plurality of gas temperatures in an engine of a vehicle 140 as shown in FIG. 9, which can be performed with the apparatus or any other apparatus or combination of apparatuses, provides one or more of the benefits of the apparatus as well as other benefits as can be appreciated by one of ordinary skill in the art.

Referring to FIG. 9, the method for estimating a plurality of gas temperatures in an engine of a vehicle 140 is illustrated according to a preferred exemplary embodiment of the present invention. While the method 140 for estimated the plurality of gas temperatures is generally illustrated in FIG. 9, it should be understood that the actions, step, calculations, process, and procedures, which are expressed or implied during the description of the apparatus of the preferred exemplary embodiment, are within the scope of the method 140 of the present invention.

The method 140 comprises receiving a velocity of the vehicle and an air mass flow rate 142 and estimating an exhaust gas temperature based at least upon the velocity of the vehicle and the air mass flow rate 144. The method also comprises receiving an EGR mass flow rate 146 and estimating an EGR gas temperature at an EGR valve based at least upon the exhaust gas temperature and the EGR mass flow rate 148. In addition, the method comprises estimating an EGR gas temperature at a throttle body based at least upon the exhaust gas temperature and the EGR mass flow rate 150. Furthermore, the method comprises estimating a charge temperature based at least upon the EGR gas temperature at the throttle body, the velocity of the vehicle, and the EGR mass flow rate 152.

From the foregoing detailed description of preferred exemplary embodiments, it should be appreciated that apparatus and methods are provided for estimating gas temperatures within an engine of a vehicle. While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

APPENDIX A
DERIVATION DETAILS FOR THE APPARATUS AND METHODS OF THE PRESENT INVENTION

From the law of conservation of energy, the rate of heat transfer to the gas in the intake manifold is as follows:

$$\text{Rate of heat transfer to the gas} = \delta q = \dot{m} c_p (T_{ch,z+\Delta z} - T_{ch,z}) \quad (1)$$

Where: $\delta q$ is rate of heat transfer to the gas, $\dot{m}$=air and EGR gas flow rates, $c_p$ is the specific heat at constant pressure, $T_{ch,z+\Delta z}$ is the temperature of the gas at $z+\Delta z$, $T_{ch,z}$ is the temperature of the gas at $z$.

The rate of heat transfer to the gas in the intake manifold can also be expressed as follows:

$$\delta q = h \Delta A_s (T_s - T_{ch}) \quad (2)$$

Where: $h$ is the average heat transfer coefficient, $A_s$ is the surface area, $T_s$ is the surface temperature, $T_{ch}$ is the temperature of the charge in relatively close proximity to intake port.

Combining equations (1) and (2) provides the following:

$$\dot{m} c_p (T_{ch,z+\Delta z} - T_{ch,z}) = h \Delta A_s (T_s - T_{ch}) \quad (3)$$

Where equation (3) can be written as:

$$\dot{m} c_p \frac{dT_{ch}}{dz} = h \frac{dA_s}{dz} (T_s - T_{ch}) \quad (4)$$

Integrating equation (4) provides:

$$\int_{in}^{out} \frac{dT_{ch}}{T_s - T_{ch}} = \int_0^{A_s} \frac{h}{\dot{m} c_p} dA_s \quad (5)$$

After the integration of equation (5), and with $T_{ch,in} = T_{mix}$ and $T_{ch,out} = T_{ch}$, the following relationship exists:

$$T_{ch} = T_s - (T_s - T_{mix}) e^{\frac{hA_s}{\dot{m} c_p}} \quad (6)$$

Where: $T_{mix}$ is the temperature of the air and EGR mixture. Mathematically manipulating equation (6) provides:

$$T_{ch} = T_{mix} e^{\frac{hA_s}{\dot{m} c_p}} + T_s \left(1 - e^{\frac{hA_s}{\dot{m} c_p}}\right) \quad (7)$$

Furthermore, adding $T_{mix}$ to each term of the equality presented in equation (7) provides the following:

$$T_{ch} + T_{mix} = T_{mix} + T_{mix} e^{\frac{hA_s}{\dot{m} c_p}} + T_s \left(1 - e^{\frac{hA_s}{\dot{m} c_p}}\right) \quad (8)$$

Equation (8) can be written as:

$$T_{ch} = T_{mix} - T_{mix} + T_{mix} e^{\frac{hA_s}{\dot{m} c_p}} + T_s \left(1 - e^{\frac{hA_s}{\dot{m} c_p}}\right) \quad (9)$$

Finally, the following expression for the temperature of the charge can be determined from the expression of equation (9) as follows:

$$T_{ch} = T_{mix} + \left(1 - e^{\frac{hA_s}{\dot{m} c_p}}\right)(T_s - T_{mix}) \quad (10)$$

From equation (10) it can be appreciated that at high airflow rates, the temperature of the charge ($T_{ch}$) is approximately equal to the temperature of the air and EGR mixture (i.e., $T_{ch} \cong T_{mix}$). As can be appreciated, the coolant temperature ($T_{cool}$) can be used to provide an estimation of the surface temperature ($T_s$) in equation (10), which provides the following relationship:

$$T_{ch} \approx T_{mix} + f_c(T_{cool} - T_{mix}) \quad (11)$$

Where $f_c$ is the coolant coefficient, representing effects such as the effect of vehicle speed on temperature, air flow and coolant temperature experimentally generated under various operating conditions of the vehicle.

From equations (10) and (11), the following expression for $f_c$ can be determined as follows:

$$f_c \propto 1 - e^{\frac{hA_s}{\dot{m}c_p}} \quad (12)$$

However, $f_c$ is also a function of engine speed (N), that is:

$$f_c = f(\dot{m}, N) \quad (13)$$

Therefore, $f_c$ can be approximated with the following non-linear equation:

$$f_c = C_1 + C_2 e^{\frac{hA_s}{\dot{m}c_p}} \quad (14)$$

Where the coefficients $C_1$ and $C_2$ are functions of engine speed. However, equation (13) does not capture the effect of the airflow over the engine when a vehicle is moving at different speeds. Therefore, to account for this effect of the wind when the vehicle is moving at different speeds, equation (13) can be written as:

$$f_c = f(\dot{m}, N, mph) \quad (15)$$

Where mph is the vehicle speed (i.e., velocity of the vehicle) in Miles Per Hour. Since the vehicle speed is a function of engine speed, and in order to simplify the implementation of $f_c$, equation (15) can be written as:

$$f_c = f(\dot{m}, mph) \quad (16)$$

It can be shown that equation (13) is a special case of equation (16). When the vehicle is at idle, equation (16) reduces to equation (13) because the vehicle speed is zero, and equation (16) can be implemented using a 2-D table look-up operation.

CHARGE TEMPERATURE WHEN THE EGR VALVE IS CLOSED

Steady State Conditions

Steady state conditions are defined herein as those conditions at which the engine speed and air mass flow are substantially constant or constant. Under steady state conditions, equation (11) can be rewritten as:

$$T_{chss} \approx T_{mix} + f_c(T_{cool} - T_{mix}) \quad (17)$$

Where $T_{chss}$ is the temperature of the charge at steady state conditions. When the EGR valve is closed, the temperature of the air and EGR mixture ($T_{mix}$) is equal to the temperature of the incoming air (i.e., $T_{mix} = T_{air}$). In addition, when the EGR valve is closed, the gas flow rate into the intake manifold is the air mass flow rate (i.e., $\dot{m} = \dot{m}_a$).

Transient Conditions With the EGR Valve Closed

Under transient conditions, the temperature of the charge changes with time as a result of changes in vehicle speed and air mass flow rate. During these conditions, the temperature of the charge can be described by the following differential equation:

$$\dot{T}_{ch} = aT_{ch} + b_1 T_{chss} \quad (18)$$

Where $T_{ch}$ is the instantaneous charge temperature and the coefficients (i.e., a and $b_1$) are functions of the operating conditions of the engine. Equation (18) can be rewritten in discrete form as follows:

$$T_{ch}(k+1) = a_d T_{ch}(k) + b_{1d} T_{chss}(k) \quad (19)$$

A special case of equation (19) is that in which $a_d = 1 - b_{1d}$, therefore:

$$T_{ch}(k+1) = (1-b_{1d})T_{ch}(k) + b_{1d} T_{chss}(k) \quad (20)$$

By using equation (20) rather that equation (18), the number of coefficients can be reduced from two to one and this also increases the probability that the steady-state gain is unity.

A COUNTING FOR EGR IN THE INTAKE MANIFOLD

The temperature of the manifold inlet gas is not just a function of the inlet air temperature with an open EGR valve. Rather, it is also a function of the temperature of EGR at the throttle, and the EGR percent in the intake manifold. The temperature of the manifold inlet gas can be expressed as follows:

$$T_{mix} = r_a T_{air} + r_e T_e \quad (21)$$

Where the temperature of the inlet air ($T_{air}$) is obtained from a production sensor, $T_e$ is the EGR temperature at the throttle body, $r_a$ and $r_e$ are the air and EGR ratios given by equation (22) and equation (23) as follows:

$$r_a = \frac{\dot{m}_a}{\dot{m}_a + \dot{m}_e} \quad (22)$$

$$r_e = \frac{\dot{m}_e}{\dot{m}_a + \dot{m}_e} \quad (23)$$

$T_e$ is preferably estimated in accordance with the present invention, and can be expressed as a function of EGR mass flow, exhaust, coolant, and inlet air temperatures as follows:

$$T_e = f(\dot{m}_e, T_{exh}, T_{air}, \dot{m}_{air}) \quad (24)$$

Equation (24) can be simplified by assuming that the main effects on the temperature of EGR at the throttle body are those due to $\dot{m}_e$ and $T_{exh}$. Under this assumption, equation (24) reduces to:

$$T_e = f(\dot{m}_e, T_{exh}) \quad (25)$$

In equation (25), $T_{exh}$ is obtained from the exhaust temperature estimator. In addition, to estimate the temperature of the charge in the presence of EGR, the EGR mass flow rate through the EGR valve ($\dot{m}_e$) is estimated in accordance with the present invention as set forth in Appendix B.

ESTIMATION OF THE EGR TEMPERATURE AT THE THROTTLE BODY

The EGR temperature at the throttle body is preferably estimated at steady state and transient conditions, with the system in a steady state condition when the engine speed, air, and EGR flows are substantially constant or constant.

EGR Temperature Estimation at Steady State Conditions

As previously discussed in this Appendix A, the EGR temperature at the throttle body is a function of the exhaust temperature and the EGR mass flow rate. Therefore, the steady-state EGR temperature at the throttle body can be expressed as follows:

$$T_{e_{ss}} \approx T_{exh} * \frac{1}{f(\dot{m}_e)} \quad (26)$$

Where $T_{ess}$ is the EGR temperature at the throttle body at steady state conditions and $f(\dot{m}_e)$ is given by the following non-linear equation:

$$f(\dot{m}_e) = C_{e1} + C_{e2} e^{-\frac{hA_s}{\dot{m}_e c_p}} \quad (27)$$

As can be appreciated, equation (27) can be implemented using a one-dimensional table look-up operation.

EGR Temperature Estimation during Transient Conditions

During transient conditions, the EGR temperature at the throttle body can be expressed as $$T_e(k+1) = a_e T_e(k) + b_{1e} T_{ess}(k) \quad (28)$$

Where $T_{ess}$ is given by equation (26) and $T_e$ is the instantaneous temperature of EGR at the throttle body. The coefficients (i.e., $a_e$ and $b_{1e}$) are functions of the EGR mass flow rate. Since $a_e = 1 - b_{1e}$, one coefficient is preferably utilized as a function of EGR flow.

Exhaust Temperature Estimation

The exhaust temperature is preferably estimated using the following equations:

$$T_{exss} = f(\dot{m}_a, \text{mph}, \text{Spark}, \dot{m}_e) \quad (29)$$

At constant spark and with the EGR valve in a closed position, equation (29) can be written as:

$$T_{exss} = f(\dot{m}_a, \text{mph}) \quad (30)$$

Equation (30) is preferably implemented using a two-dimensional table lookup operation. To obtain the final steady-state exhaust temperature, the output of this table is modified by spark and EGR mass flow rate. Therefore:

$$T_{exss} = f(\dot{m}_a, \text{mph}) + f(\text{Spark}) + f(r_e, \text{mph}) \quad (31)$$

Where $r_e$ is the EGR ratio, f(spark) represents the effect of the spark deviation from MBT on the exhaust temperature, and $f(r_e, \text{mph})$ represents the effect of EGR on the exhaust temperature.

During transient conditions the exhaust temperature is preferably obtained from the following discrete equation:

$$T_{ex}(k+1) = a_{ex} T_{ex}(k) + b_{1ex} T_{exss}(k) \quad (32)$$

In addition to the variables shown in equation (29), the fuel base pulse width (BPW) is preferably used during fuel cut-off to modify the coefficients in equation (32). The coefficients $a_{ex}$ and $b_{1ex}$ are preferably obtained from the minimization of the error between measured and estimated exhaust temperature during transient conditions.

Estimation of the EGR Temperature at the EGR Valve

The temperature of the gases at the EGR valve is utilized in the determination of the EGR mass flow rate through the EGR valve. Since it is desirable to determine this information without the use of a production sensor, an estimate is determined from other measured or estimated variables. The EGR temperature at the EGR valve, under steady state conditions, can be described by:

$$T_{v_{ss}} \approx T_{exh} * \frac{1}{f_v(\dot{m}_e)} \quad (33)$$

Where $T_{vss}$ is the EGR temperature at the EGR valve at steady state conditions and $f_v(\dot{m}_e)$ is given by the following non-linear equation:

$$f_v(\dot{m}_e) = C_{v1} + C_{v2} e^{-\frac{hA_s}{\dot{m}_e c_p}} \quad (34)$$

As can be appreciated, equation (34) can be implemented with a one-dimension table look-up operation.

EGR Temperature at the EGR Valve During Transient Conditions

During transient conditions, the EGR temperature at the EGR valve can be expressed as:

$$T_v(k+1) = a_v T_v(k) + b_{1v} T_{vss}(k) \quad (35)$$

Where $T_{vss}$ is given by equation (33) and $T_v$ is the instantaneous temperature of EGR at the EGR valve. The coefficients (i.e., $a_v$ and $b_{1v}$) are functions of the EGR mass flow rate. Since $a_v = 1 - b_{1v}$, coefficient is preferably utilized as a function of EGR flow.

APPENDIX B

ESTIMATION OF THE EGR MASS FLOW RATE

The gas mass flow rate through the EGR valve ($\dot{m}_e$) can be estimated using the following expression:

$$\dot{m}_e = A_{ef} * \frac{p_{exh}}{\sqrt{R * T_{exh}}} * \varphi \quad (1)$$

Where:

$$\varphi = \begin{cases} 0.685 & \text{if } p_r < 0.53 \\ \frac{2 * k_c}{(k_c - 1)} * (p_r^{2/k_c} - p_r^{(k_c+1)/k_c}) & \text{if } p_r > 0.53 \end{cases} \quad (2)$$

Where:

$$p_r = \frac{p_{mv}}{p_{exh}},$$

$P_{mv}$ is the EGR valve downstream pressure, and $P_{exh}$ is EGR valve upstream pressure. The assumption is made that the EGR valve downstream pressure is equal to the manifold absolute pressure (MAP) and the upstream pressure is given by:

$$P_{exh} = \text{Baro} + \text{offset} \quad (3)$$

Where: offset=$f(\dot{m}_a)$. In addition, $$k_c = \frac{c_p}{c_v}$$

is ratio of heat capacities, R is the ideal gas constant, and $A_{ef}$ is the effective valve area, which is given by:

$$A_{ef} = c_d * A_v \quad (4)$$

Where: $A_v$ is the area of the valve and a function of the EGR valve position ($x_p$) (i.e., $A_v = A_v(xp)$) and $c_d$ is the discharge coefficient of the valve.

What is claimed is:

1. An apparatus for estimating a plurality of gas temperatures in an engine of a vehicle, comprising:

an exhaust temperature estimator configured to receive a velocity of the vehicle and an air mass flow rate, said exhaust temperature estimator configured to estimate an exhaust gas temperature based at least upon said velocity of the vehicle and said air mass flow rate;

a first recirculated engine exhaust gas (EGR) temperature estimator coupled to said exhaust temperature estimator, said first EGR temperature estimator configured to receive said exhaust gas temperature from said exhaust temperature estimator and further configured to receive an EGR mass flow rate, said first EGR temperature estimator configured to estimate an EGR gas temperature at an EGR valve of the engine based at least upon said exhaust gas temperature and said EGR mass flow rate;

a second EGR temperature estimator coupled to said exhaust temperature estimator, said second EGR temperature estimator configured to receive said exhaust gas temperature from said exhaust temperature estimator and further configured to receive said EGR mass flow rate, said second EGR temperature estimator configured to estimate an EGR gas temperature at a throttle body of the engine based at least upon said exhaust gas temperature and said EGR mass flow rate; and a charge temperature estimator coupled to said second EGR temperature estimator, said charge temperature estimator configured to receive said EGR gas temperature at said throttle body from said second EGR temperature estimator, said charge temperature estimator further configured to receive said velocity of the vehicle and said EGR mass flow rate, said charge temperature estimator configured to estimate a charge gas temperature based at least upon said EGR gas temperature at said throttle body, said velocity of the vehicle, and said EGR mass flow rate.

2. The apparatus for estimating the plurality of gas temperatures in the engine of the vehicle of claim 1, wherein said exhaust gas temperature estimator is further configured to estimate said exhaust gas temperature based at least upon an estimate of an EGR mass flow rate and an engine velocity.

3. The apparatus for estimating the plurality of gas temperatures in the engine of the vehicle of claim 1, wherein said charge temperature estimator is further configured to estimate said charge gas temperature based at least upon an engine coolant temperature and an engine inlet temperature.

4. The apparatus for estimating the plurality of gas temperatures in the engine of the vehicle of claim 1, said exhaust gas temperature estimator comprises:

an air temperature estimator configured to generate an air temperature estimate based at least upon said air mass flow rate and said velocity of the vehicle;

an EGR gas temperature estimator configured to generate an EGR temperature estimate based at least upon an EGR ratio and the velocity of the vehicle;

a spark effect determinator configured to generate an effect of engine spark on temperature estimate based at least upon air mass flow rate and an engine speed; and a exhaust temperature summer configured to produce said exhaust gas temperature from said air temperature estimate, EGR temperature estimate, and said effect of engine spark on temperature estimate.

5. The apparatus for estimating the plurality of gas temperatures in the engine of the vehicle of claim 4, wherein at least one of said air temperature estimator, said EGR gas temperature estimator, and said spark effect determinator is a lookup table operator.

6. The apparatus for estimating the plurality of gas temperatures in the engine of the vehicle of claim 1, further comprising a first order lag filter configured to remove high frequency components of said exhaust gas temperature.

7. The apparatus for estimating the plurality of gas temperatures in the engine of the vehicle of claim 1, wherein said first EGR temperature estimator comprises a first steady-state EGR temperature estimator configured to estimate a steady-state EGR temperature at an EGR valve based at least upon said EGR mass flow rate.

8. The apparatus for estimating the plurality of gas temperatures in the engine of the vehicle of claim 1, further comprising a first order lag filter configured to remove high frequency components of said EGR gas temperature at said EGR valve.

9. The apparatus for estimating the plurality of gas temperatures in the engine of the vehicle of claim 1, wherein said second EGR temperature estimator comprises a second steady-state EGR temperature estimator configured to estimate a steady-state EGR temperature at a throttle body based at least upon said EGR mass flow rate.

10. The apparatus for estimating the plurality of gas temperatures in the engine of the vehicle of claim 1, further comprising a first order lag filter configured to remove high frequency components of said EGR gas temperature at said throttle body.

11. The apparatus for estimating the plurality of gas temperatures in the engine of the vehicle of claim 1, wherein said charge temperature comprises:

a first order lag filter configured to remove high frequency components of said charge gas temperature;

a charge time constant determinator configured to determine a filter time constant for said first order lag filter.

12. A method for estimating a plurality of gas temperatures in an engine of a vehicle, comprising:

receiving a velocity of the vehicle and an air mass flow rate;

estimating an exhaust gas temperature based at least upon said velocity of the vehicle and said air mass flow rate;

receiving an EGR mass flow rate;

estimating an EGR gas temperature at a EGR valve based at least upon said exhaust gas temperature and said EGR mass flow rate;

estimating an EGR gas temperature at a throttle body based at least upon said exhaust gas temperature and said EGR mass flow rate; and estimating a charge temperature based at least upon said EGR gas temperature at said throttle body, said velocity of the vehicle, and said EGR mass flow rate.

13. The method for estimating the plurality of gas temperatures in the engine of the vehicle of claim 12, further comprising estimating said exhaust gas temperature based at least upon an estimate of an EGR mass flow rate and an engine velocity.

14. The method for estimating the plurality of gas temperatures in the engine of the vehicle of claim 12, further comprising estimating said charge temperature based at least upon an engine coolant temperature and an engine inlet temperature.

15. The method for estimating the plurality of gas temperatures in the engine of the vehicle of claim 12, wherein said estimating said exhaust gas temperature based at least upon said velocity of the vehicle and said air mass flow rate further comprises:

generating an air temperature estimate based at least upon said air mass flow rate and said velocity of the vehicle;

generating an EGR temperature estimate based at least upon an EGR ratio and the velocity of the vehicle; and generating an effect of spark on temperature based at least upon air mass flow rate and an engine speed.

16. The method for estimating the plurality of gas temperatures in the engine of the vehicle of claim 12, further comprising filtering said exhaust gas temperature.

17. The method for estimating the plurality of gas temperatures in the engine of the vehicle of claim 12, further comprising filtering said EGR gas temperature at said EGR valve.

18. The method for estimating the plurality of gas temperatures in the engine of the vehicle of claim 12, further comprising filtering said EGR gas temperature at said throttle body.

19. The method for estimating the plurality of gas temperatures in the engine of the vehicle of claim 12, further comprising filtering said charge temperature.

20. The method for estimating the plurality of gas temperatures in the engine of the vehicle of claim 12, wherein said estimating said EGR gas temperature at said EGR valve comprises estimating a steady-state EGR temperature at said EGR valve based at least upon said EGR mass flow rate.

21. The method for estimating the plurality of gas temperatures in the engine of the vehicle of claim 12, wherein said estimating said EGR gas temperature at said throttle body comprises estimating a steady-state EGR temperature at said throttle based at least upon said EGR mass flow rate.

22. An apparatus for estimating a plurality of gas temperatures in an internal combustion engine of an automobile, comprising:

an exhaust temperature estimator configured to receive a velocity of the vehicle and an air mass flow rate, said exhaust temperature estimator configured to estimate an exhaust gas temperature based at least upon said velocity of the vehicle, said air mass flow rate, an EGR mass flow rate and an engine velocity, said exhaust temperature estimator comprising:

an air temperature estimator configured to generate an air temperature estimate based at least upon said air mass flow rate and said velocity of the vehicle;

an EGR gas temperature estimator configured to generate an EGR temperature estimate based at least upon an EGR ratio and the velocity of the vehicle;

a spark effect determinator configured to generate an effect of engine spark on temperature estimate based at least upon air mass flow rate and an engine speed; and an exhaust temperature summer configured to produce said exhaust gas temperature from said air temperature estimate, EGR temperature estimate, and said effect of engine spark on temperature estimate;

a first recirculated engine exhaust gas (EGR) temperature estimator coupled to said exhaust temperature estimator, said first EGR temperature estimator configured to receive said exhaust gas temperature from said exhaust temperature estimator and further configured to receive an EGR mass flow rate, said first EGR temperature estimator configured to estimate an EGR gas temperature at an EGR valve of the engine based at least upon said exhaust gas temperature and said EGR mass flow rate;

a second EGR temperature estimator coupled to said exhaust temperature estimator, said second EGR temperature estimator configured to receive said exhaust gas temperature from said exhaust temperature estimator and further configured to receive said EGR mass flow rate, said second EGR temperature estimator configured to estimate an EGR gas temperature at a throttle body of the engine based at least upon said exhaust gas temperature and said EGR mass flow rate; and a charge temperature estimator coupled to said second EGR temperature estimator, said charge temperature estimator configured to receive said EGR gas temperature at said throttle body from said second EGR temperature estimator, said charge temperature estimator further configured to receive said velocity of the vehicle and said EGR mass flow rate, said charge temperature estimator configured to estimate a charge gas temperature based at least upon said EGR gas temperature at said throttle body, said velocity of the vehicle, said EGR mass flow rate, an engine coolant temperature and an engine inlet temperature.

* * * * *